United States Patent [19]

Im et al.

[11] Patent Number: 5,237,034
[45] Date of Patent: Aug. 17, 1993

[54] PREPARATION OF SILOXANE MODIFIED POLYIMIDE RESIN

[75] Inventors: Seoung J. Im, Seoul; Dae H. Lee, Inchon-si, both of Rep. of Korea

[73] Assignee: Cheil Synthetics, Inc., Kyungbuk, Rep. of Korea

[21] Appl. No.: 812,459

[22] Filed: Dec. 23, 1991

[30] Foreign Application Priority Data

Jan. 24, 1991 [KR] Rep. of Korea ............ 91-1190

[51] Int. Cl.$^5$ .............................................. C08G 77/06
[52] U.S. Cl. ........................................ 528/26; 528/28; 528/38
[58] Field of Search ............................. 528/26, 28, 38

[56] References Cited

U.S. PATENT DOCUMENTS

| | | | |
|---|---|---|---|
| 3,615,913 | 10/1971 | Shaw | 148/33.3 |
| 3,740,305 | 6/1973 | Hoback et al. | 161/183 |
| 4,011,279 | 3/1977 | Berger et al. | 260/824 R |
| 4,030,948 | 6/1977 | Berger | 148/33.3 |
| 4,395,527 | 7/1983 | Berger | 528/26 |
| 4,405,208 | 9/1983 | Shirai | 350/341 |
| 4,668,755 | 5/1987 | Davis | 528/26 |
| 4,781,439 | 11/1988 | Yokokura et al. | 350/341 |
| 4,874,834 | 10/1989 | Higashi et al. | 528/176 |
| 4,970,283 | 11/1990 | Kunimune et al. | 528/26 |

FOREIGN PATENT DOCUMENTS

| | | |
|---|---|---|
| 58-17418 | 2/1983 | Japan . |
| 60-91329 | 5/1985 | Japan . |
| 60-166325 | 8/1985 | Japan . |
| 63-20522 | 1/1988 | Japan . |

OTHER PUBLICATIONS

Synthesis and properties of novel polyamide membane for ultrafiltration Kang, et al. Abstract 1989.
Synthesis of new polyamides from p-(p-aminobenzamido)phenyl p-aminobenzoate monomer. Suh, et al. Abstract 1988.
Thermotropic liquid crystal behavior in some aromatic esterimides Kalyvas Abstract 1982.
Synthesis of novel wholly aromatic polyamide-ester copolymers from aromatic diamines and terephthaloyl choride. Kim et al. Abstract 1988.
Polyamide-polyimides having low thermal expansivity. Watanabe Abstract 1986.
Manufacture of high-strength and modulus poly(amide imide) fibers. Takahashi Abstract 1986.
High modulus fibers and films from a wholly aromatic polyamideimide Jinda Abstract 1988.
Polyimide laminates. Kanda Abstract 1985.
Polyimide laminates. Kanda Abstract 1985.

*Primary Examiner*—John C. Bleutge
*Assistant Examiner*—Margaret Glass
*Attorney, Agent, or Firm*—Lowe, Price, LeBlanc & Becker

[57] ABSTRACT

A siloxane modified polyimide resin having high heat resistance and processability is prepared by reacting a siloxane diamine of formula (1) and an aromatic diamine of formula (2) with an aromatic tetracarboxylic dianhydride of formula (3) in a polar solvent.

$$H_2N-R_1-\underset{R_2}{\underset{|}{Si}}(-O-\underset{R_2}{\underset{|}{Si}})_n R_1-NH_2 \quad (1)$$

$$H_2N-\text{Ar}-X_1-\text{Ar}-NH_2 \quad (2)$$

(3) [dianhydride structure]

wherein,
R represents (Abstract continued on next page.)

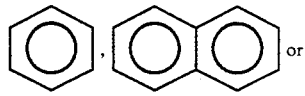 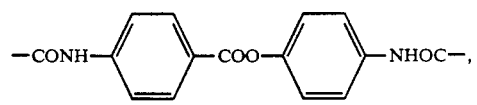
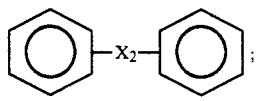
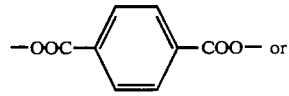
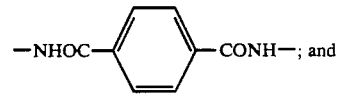
$R_1$ and $R_2$ represent aromatic or aliphatic hydrocarbons;
n represents an integer of 1 to 1000;
$X_1$ represents
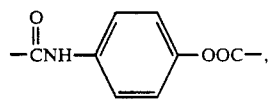
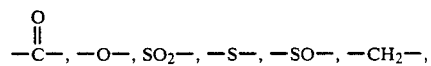
$X_2$ represents
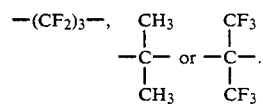
6 Claims, No Drawings

PREPARATION OF SILOXANE MODIFIED POLYIMIDE RESIN

FIELD OF THE INVENTION

The present invention relates to a process for preparing siloxane modified polyimide resins having excellent heat resistant properties and processabilities. Siloxane modified polyimide resins of the present invention are useful for the surface protective coatings of semiconductor devices, and are prepared from siloxane diamines, aromatic diamines having two or more of ester, amide or ester-amide bonds and tetracarboxylic dianhydrides.

BACKGROUND OF THE INVENTION

Polyimide compounds are widely used in films, wire coating materials and electronic and electric materials. It is impossible to rearrange polyimide compounds, due to their molecular structure and because said compounds have strong chemical bonds and resonance stability.

Prior art polyimide compounds are used in the form of a solvent-insoluble film, which is prepared by polymerizing an aromatic tetracarboxylic dianhydride such as pyromellitic anhydride, with an aromatic diamine in a polar solvent to give an aromatic polyamic acid, applying the resultant compound onto a substrate and heating it.

Prior art aromatic-based siloxane modified polyimides are classified into two types: one is the siloxane-based polyimide that is used in liquid crystal alignment layer (U.S. Pat. No. 4,405,208; Japanese Laid Open Patent Publication No. (Sho) 60-91329), adhesives (U.S. Pat. No. 4,011,279), composite materials (U.S. Pat. Nos. 3,740,305, and 4,395,527) and the like, and the other is the siloxane-based polyimide that is used as the protective coatings for semiconductors (U.S. Pat. Nos. 3,615,913, and 4,030,948).

However, the high glass transition temperature and the absence of a suitable solvent renders the prior art polyimide compounds difficult in processing. In addition, since the precursor polyamic acid is sensitive to moisture, heat and temperature, when it stands at room temperature an undesirable whitening phenomenon is caused wherein the viscosity of polyamic acid solution decreases and the solution is partially ring-closed and becomes insoluble. Furthermore, the prior art preparation of the polyimide compound is disadvantageous in view of the energy saving and protection of semiconductor components, since polyamic acid should be heated at a high temperature of above 300° C. for long periods, so that the polyamic acid coated on the substrate is imidized. There are also limitations in its use for semiconductor protective coatings, liquid crystal alignment layer, and the like, since the prior art polyimide adheres poorly to substrates such as silicon wafer and has low clearness.

In order to solve such drawbacks, aromatic radicals are introduced into molecular chains (Japanese Laid Open Patent Publication No. (Sho) 58-17418) or sulfone-based monomers are incorporated into molecular chains (U.S. Pat. No. 4,874,834) in order to increase the effective volume of the polymer itself, whereby the transparency is improved, or the heat resistant property is improved by using fluoro-substituted monomers (U.S. Pat. No. 4,781,439).

Japanese Laid Open Patent Publication Nos. (Sho) 63-205322 and 60-166325 and U.S. Pat. No. 4,668,755 disclose a method for preparing siloxane-modified polyimide using acid dianhydride, aromatic diamine and siloxane diamine.

When the polyimide prepared by the above methods is used as coatings for a semiconductor and other electronic devices, the adhesion to the substrate, such as a silicon wafer, is excellent, due to the introduction of silicon radicals. However, if the heat resistance is increased, then mechanical properties such as tensile strength and elongation are decreased. In contrast, if the mechanical properties are increased, then the heat resistance is decreased.

The present inventors have investigated the prior art problems in order to solve them. As a result, it is found that the synthesis of siloxane modified polyimide resin using specific diamine components provides the key to solve the prior problems. The present invention is based on such a discovery.

Polyimide resin prepared by the present invention provides a high heat resistant property and processability, good adhesion to the silicon wafer substrate due to the presence of silicone in the molecular structure, and high transparency owing to the good dissolving property of the polyamic acid in polar solvents. Thus, the polyimide resin prepared by the present invention is suitable for use as protective coatings for semiconductors and liquid crystal alignment layer.

SUMMARY OF THE INVENTION

The present invention pertains to a process for preparing siloxane modified polyimide resin, which comprises reacting 1 to 40 mol % of diamino siloxanes represented by the general formula (1) and 99 to 60 mol % of aromatic diamines represented by the general formula (2) or the mixture thereof with aromatic tetracarboxylic dianhydrides or derivatives thereof represented by the general formula (3) or the mixture thereof in polar solvents, wherein compounds (3) are used with compounds (1) and (2) in an equivalent molar ratio.

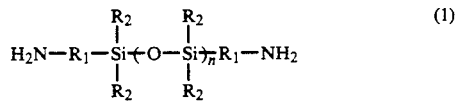
(1)

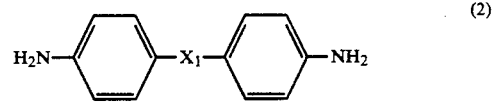
(2)

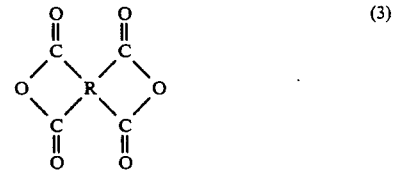
(3)

wherein,
R represents

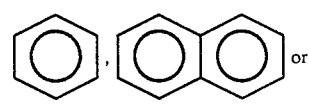

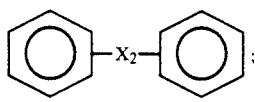

R₁ and R₂ represent aromatic or aliphatic hydrocarbons,

X₁ represent

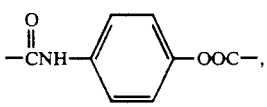

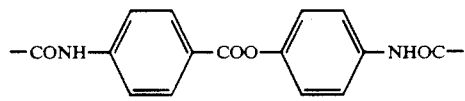

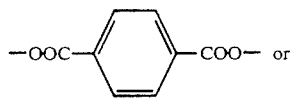 or

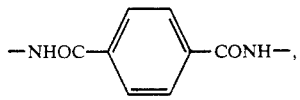,

X₂ represents

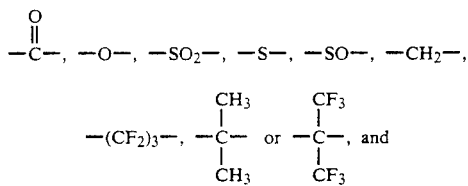

n represents an integer of 1 to 1000.

DETAILED DESCRIPTION OF THE INVENTION

The diamino siloxane used in the present invention is a compound wherein aromatic or aliphatic hydrocarbon radicals are bonded to the silicone atom chain, as defined in the general formula (1). Preferably, bis-γ-aminopropyltetramethyldisiloxane is included.

The aromatic diamine compound used in the present invention has two or more of ester, amide or amide-ester bonds between the rings of a diamine compound having two or more rings. Such a compound includes four compounds as defined in the general formula (2). In particular, the preferable one includes p-(p-aminobenzamido)-phenyl-p-aminobenzoate (hereinafter, referred to as an "ABPAB").

The preparation of an ABPAB as a diamine compound, which is an important compound in the present invention, is as follows:

p-Aminophenol and 2 equivalent weights of p-nitrobenzoyl chloride are condensed in the presence of a pyridine catalyst in dimethyl acetamide (hereinafter, referred to as a "DMAc") to obtain p-(p-nitrobenzamido)-phenyl-p-nitrobenzoate (hereinafter, referred to as a "NBPNB"), and then the resultant compound is reduced with catalytic amounts of Pd/C at 1 to 50 atm of hydrogen pressure in a high pressure reactor to give an ABPAB.

Such a process may be illustrated using the following reaction scheme:

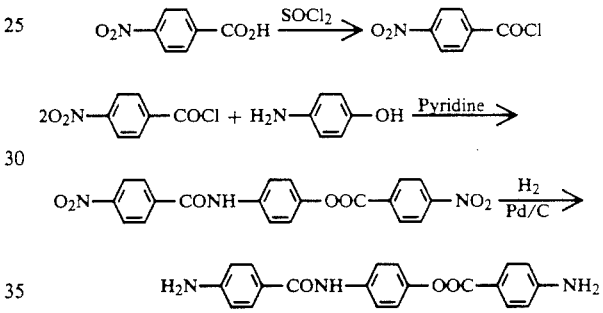

Synthesis of p-(p-aminobenzamido)-phenyl-p-(p-aminobenzamido)-benzoate(hereinafter, referred to as a "ABPABB") used in the present invention is as follows: p-nitro phenol and p-nitrobenzoyl chloride are condensed to obtain p-nitrophenyl-p-nitrobenzoate, and the resultant compound is reduced at 1 to 50 atm. of hydrogen pressure in the presence of a Raney Ni catalyst to give p-aminophenyl-p-aminobenzoate. This compound is condensed with 2 equivalent weights of p-nitrobenzoyl chloride to give a nitro compound. The resultant nitro compound is reduced under 1 to 50 atm. of hydrogen pressure to obtain an ABPABB.

Such a synthesis may be demonstrated with the following reaction schemes:

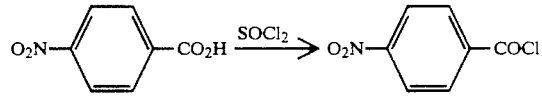

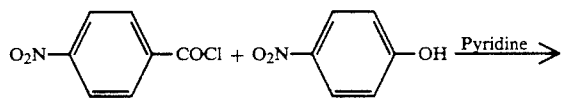

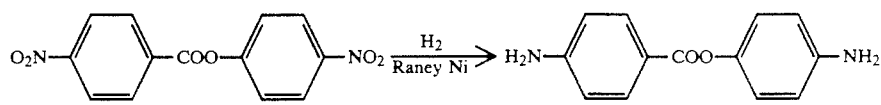

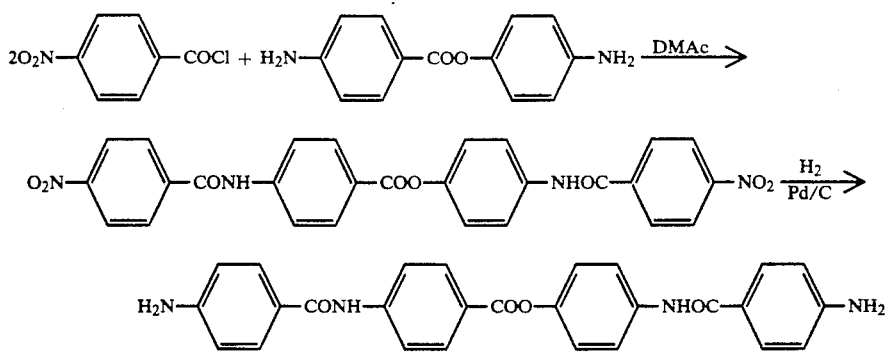

The bis(p-aminophenyl) terephthalate(hereinafter, referred to as a "BAPT") used in the present invention can be prepared by condensing terephthaloyl chloride with 2 equivalent weights of p-nitrophenol to give a nitro compound, and reducing the nitro compound at 1 to 50 atm. of hydrogen pressure in the presence of a Raney Ni catalyst.

The above reaction route may be presented as follows:

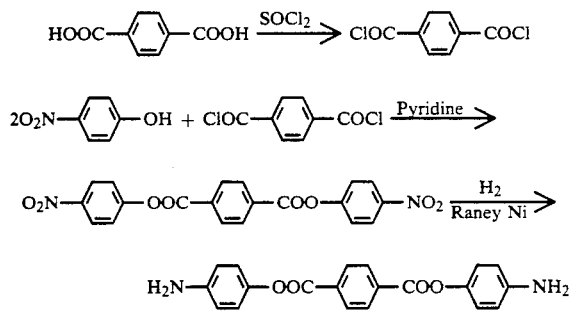

The bis(p-aminophenyl) terephthalamide (hereinafter, referred to as a "BATPA") used in the present invention may be obtained by condensing terephthaloyl chloride with 2 equivalent weights of p-nitroaniline to give a nitro compound, and then reducing the nitro compound at 1 to 50 atm. of hydrogen pressure in the presence of a Pd/C catalyst.

This reaction route may be presented as follows:

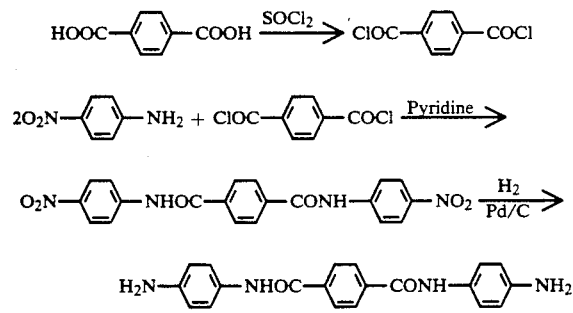

Pyromellitic dianhydride(PMDA), biphenyltetracarboxylic dianhydride (BPDA), benzophenonetetracarboxylic dianhydride(BTDA) and the mixture thereof are preferably used in the present invention as the tetracarboxylic dianhydride of formula (3).

The siloxane modified polyimide resin solution of the present invention may be prepared in the following manners: Equimolar amounts of aromatic tetracarboxylic dianhydride of formula (3) are added to 1 to 40 mol % of diamino siloxane of formula (1) and 99 to 60 mol % of aromatic diamine of formula (2). The resultant mixture is stirred in polar solvents at a temperature of 10° C. to 25° C. for 1 to 3 hrs. During the stirring, the viscosity of the reaction solution increased to above 10,000 Ps. In order to control the viscosity of said solution to a level suitable for film coatings, the solution is further stirred at a temperature of 70° C. to 100° C. for 8 hrs. in order to decrease the viscosity to a level of 150 Ps(at 25° C., rotation viscometer), whereby the polyamic acid of the present invention is formed.

The polar solvents used in the present invention include N-methylpyrrolidone(NMP), dimethylformamide(DMF), dimethylacetamide(DMAc) and the mixtures thereof.

The pale, yellowish clear polyimide solution product produced according to the present invention has a clearness of 11 to 12 as measured by Gardner Color Scale. Said product also has good adhesive strength to the silicon wafer, and thus is suitable for use in protective coatings for semiconductors, liquid crystal alignment layer, and the like.

The pale, yellowish polyimide film is prepared by applying the polyimide coating solution of the present invention to the surface of the wafer and curing under nitrogen gas atmosphere in three temperature steps(for 1 hr. each at 100° C., 200° C. and 300° C.). The polyimide film is effectively used as an insulation film for semiconductors, since it has good adhesion and plain ability and high thermal stability, and thus cracks are not generated.

Since the contents of the ester groups and amide groups in high molecular chain of the present siloxane modified polyimide resin can be varied depending on the aromatic diamine, the heat resistant property, processability and mechanical strength can be controlled. In addition, the polyimide film obtained by applying a polyamic acid of the polyimide intermediate solution onto the surface of the wafer and curing it has good tensile strength and elongation. Also, the thermal decomposition temperature of the polyimide according to the present invention is as high as 20° C. to 40° C. greater than the conventional siloxane modified polyimide.

The introduction of soft functional radicals into the molecular structure increases the effective volume of the high molecular chain. Accordingly, the solubility of the polyimide according to the present invention is increased over the hard structural polyimide to obtain the pale yellowish clear polyamic acids. In addition, the polyimide coatings applied to the surface of the silicon wafer have good adhesive properties, improved heat resistance and resistance to cracking, and thus, are suitable for use as protective insulating coatings for semiconductors or liquid crystal alignment layer.

The present invention will be described in detail by means of the working examples, which are not to be construed to limit the present invention.

EXAMPLE 1

PMDA(21.8 g, 0.1 mol), bis-γ-aminopropyltetramethyldisiloxane(2.485 g, 0.01 mol) and ABPAB(31.26 g, 0.09 mol) are added to NMP(400 ml), and the mixture is stirred at 15° C. for 2 hrs. During the stirring, the viscosity of the reaction solution is increased to above 10,000 Pa. In order to decrease the viscosity to a level suitable for film coating, the reaction solution is heated at 80° C. for 10 hrs. with stirring. The viscosity of the solution measured at 25° C. using rotation viscometer is about 150 Ps. The solution is spin-coated on the silicon wafer, and heated at 100° C., 200° C. and 300° C. for 1 hr. each in order to form polyimide coatings. The adhesive property of the coatings is measured by forming 2 mm×2 mm size polyimide coatings on the wafer and peeling them off with scotch tape.

The thermal property of the coatings is determined by measuring the initial thermal decomposition temperature using thermogravimetric analysis(TGA).

Mechanical strength is measured using an Instron.

The results are set forth in Table 3.

EXAMPLES 2 TO 4

The same procedure as described in Example 1 is conducted, except that the dianhydride components and the contents of the diaminosiloxane are changed, as disclosed in Table 1.

The results are also presented in Table 3.

EXAMPLE 5

PMDA(21.8 g, 0.1 mol), bis-γ-aminopropyltetramethyldisiloxane(2.485 g, 0.01 mol) and ABPAB(41.99 g, 0.09 mol) are added to NMP(400 ml), and the mixture is stirred at 15° C. for 2 hrs. During the stirring, the viscosity of the reaction solution is increased to above 10,000 Ps. The reaction solution is heated at 80° C. for 12 hrs. with stirring in order to decrease the viscosity to a level suitable for film coating. The viscosity of the solution measured at 25° C. using rotation viscometer is about 150 Ps.

The coating conditions and method of evaluation are carried out as described in Example 1.

The results are given in Table 3.

EXAMPLES 6 TO 8

The same procedure as described in Example 5 is carried out, except that the dianhydride components and the contents of the diaminosiloxane are varied, as described in Table 1.

The results are also presented in Table 3.

EXAMPLE 9

PMDA(21.8 g, 0.1 mol), bis-γ-aminopropyltetramethyldisiloxane(2.485 g, 0.01 mol) and BADT(31.35 g, 0.09 mol) are added to NMP(350 ml), and the mixture is stirred at 15° C. for about 2 hrs. During the stirring, the viscosity of the reaction solution is increased to above 10,000 Ps. The reaction solution is heated at 80° C. for 8 hrs. with stirring so as to decrease the viscosity to a level suitable for film coating. The viscosity of the solution measured at 25° C. using rotation viscometer is about 150 Ps.

The coating conditions and method of evaluation are carried out as disclosed in Example 1. The results are listed on Table 3.

EXAMPLES 10 TO 12

Examples 10 to 12 are carried out in the same manner as Example 9, except that the dianhydride components and the contents of the diaminosiloxane are varied, as described in Table 1. The results are given in Table 3.

EXAMPLE 13

BTDA(32.22 g. 0.1 mol), bis-γ-aminopropyltetramethyldisiloxane(2.485 g, 0.01 mol) and BAPTA(31.18 g, 0.09 mol) are added to DMAc(350 ml), and the mixture is stirred at 15° C. for 2 hrs. During the stirring, the viscosity of the solution is increased to above 10,000 Ps. The solution is heated at 80° C. for 10 hrs. with stirring, in order to decrease the viscosity to a level suitable for film coating. The viscosity of the solution measured at 25° C. using a rotation viscometer is about 150 Ps.

The coating conditions and method of evaluation are carried out as disclosed in Example 1. The results are shown on Table 3.

EXAMPLES 14 TO 16

Examples 14 to 16 are carried out in the same manner as Example 13, except that the dianhydride components and the contents of the diaminosiloxane are varied, as set forth in Table 1. The results are given in Table 3.

EXAMPLE 17

BTDA(16.11 g, 0.05 mol), PMDA(10.906 g, 0.05 mol), bis-γ-aminopropyltetramethyldisiloxane(2.485 g, 0.01 mol) and ABPAB(31.26 g, 0.09 mol) are added to NMP(400 ml), and the mixture is stirred at 15° C. for about 2 hrs. The viscosity of the solution increases to 10,000 Ps. The solution is heated at 80° C. for 9 hrs. with stirring to decrease the viscosity to a level suitable for film coating. The viscosity measured at 25° C. using a rotation viscometer is about 150 Ps.

The coating conditions and method of evaluation are carried out as described in Example 1. The results are presented on Table 3.

EXAMPLES 18 TO 21

Examples 18 to 21 are conducted in the same manner as Example 17, except that the dianhydride components, the contents of the diaminosiloxane and the aromatic diamine components are varied, as shown in Table 1. The results are given in Table 3.

COMPARATIVE EXAMPLES 1 TO 5

Comparative examples 1 to 5 are carried out in the same manner as Example 1, except that 4,4'-diaminodiphenylether, as set forth in Table 2, is used as an aromatic diamine to form the siloxane polyimide. The results are shown on Table 4.

COMPARATIVE EXAMPLES 6 TO 9

Comparative examples 6 to 9 are carried out in the same manner as Example 1, except that 4,4'-diaminodiphenylmethane, as set forth in Table 2, is used as an aromatic diamine to form the siloxane polyimide. The results are given in Table 4.

COMPARATIVE EXAMPLES 10 TO 13

Comparative examples 10 to 13 are carried out in the same manner as Example 17, except that the dianhydride components and the contents of diaminosiloxane are varied, and 4,4'-diaminodiphenylether and 4,4'-diaminodiphenylmethane are used to form the siloxane polyimide. The results are presented in Table 4.

TABLE 1

| Composition (Molar ratio) | | Example | | | | | | | | | | | | | | | | | | | | |
|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 |
| Dianhydride components | PMDA | 1.0 | — | — | — | 1.0 | — | — | — | 1.0 | — | — | 1.0 | — | — | 1.0 | 1.0 | 0.5 | 0.5 | 0.5 | 0.5 | 0.5 |
| | BPDA | — | 1.0 | — | 1.0 | — | 1.0 | — | 1.0 | — | 1.0 | — | — | — | 1.0 | — | — | — | — | — | — | — |
| | BTDA | — | — | 1.0 | — | — | — | 1.0 | — | — | — | 1.0 | — | 1.0 | — | — | — | 0.5 | 0.5 | 0.5 | 0.5 | 0.5 |
| Diamine components | Siloxane diamine | 0.1 | 0.1 | 0.1 | 0.2 | 0.1 | 0.1 | 0.1 | 0.2 | 0.1 | 0.1 | 0.1 | 0.2 | 0.1 | 0.1 | 0.1 | 0.2 | 0.1 | 0.1 | 0.1 | 0.1 | 0.2 |
| | ABPAB | 0.9 | 0.9 | 0.9 | 0.8 | — | — | — | — | — | — | — | — | — | — | — | — | — | 0.9 | — | — | — | 0.8 |
| | ABPABB | — | — | — | — | 0.9 | 0.9 | 0.9 | 0.8 | — | — | — | — | — | — | — | — | — | — | 0.9 | — | — |
| | BAPT | — | — | — | — | — | — | — | — | 0.9 | 0.9 | 0.9 | 0.8 | — | — | — | — | — | — | — | 0.9 | — |
| | BAPTA | — | — | — | — | — | — | — | — | — | — | — | — | 0.9 | 0.9 | 0.9 | 0.8 | — | — | — | 0.9 | — |

TABLE 2

| Composition (Molar ratio) | | Comparative example | | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 | 13 |
| Dianhydride components | PMDA | 1.0 | — | — | — | 1.0 | 1.0 | — | — | 1.0 | 0.5 | 0.5 | 0.5 | 0.5 |
| | BPDA | — | — | — | 1.0 | — | — | 1.0 | — | — | — | — | — | — |
| | BTDA | — | 1.0 | 1.0 | — | — | — | — | 1.0 | — | 0.5 | 0.5 | 0.5 | 0.5 |
| Diamine components | Siloxane diamine | 0.1 | 0.1 | 0.2 | 0.1 | 0.2 | 0.1 | 0.1 | 0.1 | 0.2 | 0.1 | 0.2 | 0.1 | 0.2 |
| | 4,4'-Diaminodiphenylether | 0.9 | 0.9 | 0.8 | 0.9 | 0.8 | — | — | — | — | 0.9 | 0.8 | — | — |
| | 4,4'-Diaminodiphenylmethane | — | — | — | — | — | 0.9 | 0.9 | 0.9 | 0.8 | — | — | 0.9 | 0.8 |

TABLE 3

| Properties of the products | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Thermal decomposition temperature (°C., 5% wt loss) | | 565 | 560 | 552 | 380 | 568 | 566 | 555 | 395 | 560 | 554 | 549 |
| Thermal expansion coefficient (×10⁻⁵ cm/cm °C.) | 100° C. | 3.9 | 3.8 | 3.8 | 3.2 | 3.7 | 3.8 | 3.9 | 3.2 | 3.9 | 3.8 | 3.8 |
| | 400° C. | 4.3 | 4.3 | 4.1 | 3.5 | 4.3 | 4.1 | 4.4 | 3.6 | 4.2 | 4.2 | 4.1 |
| Adhesive strength | | good | good | good | good | good | good | good | good | good | good | good |
| Tensile strength (kg/mm$^2$) | | 15 | 14 | 14 | 12 | 14 | 13 | 14 | 14 | 15 | 15 | 14 |
| Elongation (%) | | 15 | 13 | 14 | 11 | 13 | 13 | 13 | 12 | 13 | 13 | 14 |

| Properties of the products | | Example | | | | | | | | | |
|---|---|---|---|---|---|---|---|---|---|---|---|
| | | 12 | 13 | 14 | 15 | 16 | 17 | 18 | 19 | 20 | 21 |
| Thermal decomposition temperature (°C., 5% wt loss) | | 382 | 558 | 560 | 564 | 410 | 562 | 564 | 560 | 555 | 403 |
| Thermal expansion coefficient (×10⁻⁵ cm/cm °C.) | 100° C. | 3.3 | 3.8 | 3.9 | 3.8 | 3.4 | 3.9 | 3.7 | 3.8 | 3.8 | 3.3 |
| | 400° C. | 3.7 | 4.2 | 4.2 | 4.1 | 3.6 | 4.2 | 4.2 | 4.3 | 4.3 | 3.6 |
| Adhesive strength | | good | good | good | good | good | good | good | good | good | good |
| Tensile strength (kg/mm$^2$) | | 12 | 15 | 14 | 15 | 13 | 14 | 14 | 13 | 13 | 11 |
| Elongation (%) | | 12 | 14 | 14 | 15 | 12 | 13 | 12 | 13 | 13 | 11 |

TABLE 4

| Properties of the products | Comparative Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Thermal decomposition temperature (°C., 5% wt loss) | 547 | 535 | 358 | 542 | 410 | 540 | 536 | 530 | 370 | 535 | 380 | 525 | 365 |

TABLE 4-continued

| Properties of the products | | Comparative Example | | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 | 13 |
| Thermal expansion coefficient ($\times 10^{-5}$ cm/cm °C.) | 100° C. | 3.9 | 3.8 | 3.3 | 3.4 | 3.2 | 3.7 | 3.8 | 3.5 | 3.0 | 3.8 | 3.1 | 3.4 | 3.0 |
| | 400° C. | 4.1 | 4.1 | 3.9 | 3.7 | 3.6 | 4.1 | 4.0 | 4.0 | 3.6 | 4.2 | 3.4 | 3.6 | 3.3 |
| Adhesive strength | | good | good | good | good | good | good | good | good | good | good | good | good | good |
| Tensile strength (kg/mm²) | | 7 | 8 | 11 | 9 | 11 | 12 | 10 | 11 | 11 | 12 | 11 | 9 | 10 |
| Elongation (%) | | 8 | 6 | 8 | 8 | 7 | 9 | 9 | 7 | 8 | 12 | 8 | 8 | 8 |

Tables 3 and 4 demonstrate that the thermal decomposition temperature of the siloxane modified polyimide prepared from an aromatic diamine is above 20° C. higher than that of a polyimide prepared from 4,4'-diaminodiphenylether or 4,4'-diaminodiphenylmethane. Also, the tensile strength and elongation of the former are considerably improved, whereas the thermal expansion coefficient is similar to that of a conventional siloxane modified polyimide.

In particular, it is found that the aromatic diamine monomer ABPAB having an amide radical to a ester radical ratio of 1:1 has thermal and mechanical property advantages over either ABPABB or BAPTA having high amide radical contents. Also, the more the contents of siloxane diamine increase, the more the thermal decomposition temperature sharply decreases.

We claim:

1. A process for preparing siloxane-modified polyimide resins, which comprises reacting 1 to 40 mol % of a diaminosiloxane having the general formula (1) and 99 to 60 mol % of (2) p-(p-aminobenzamido)-phenyl-p-aminobenzoate, based on the molar content of diamines, with an aromatic tetracarboxylic dianhydride having the general formula (3) in a polar solvent, wherein the aromatic tetracarboxylic dianhydride is reacted with the mixture of compound (1) and compound (2) in an equivalent molar ratio,

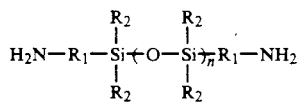
(1)

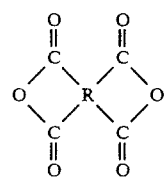
(3)

wherein,
R represents

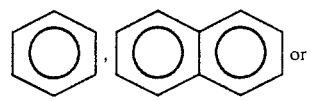

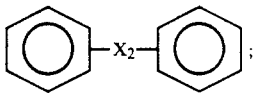

$R_1$ and $R_2$ represent aromatic or aliphatic hydrocarbons;
n represents an integer of 1 to 1000; and
$X_2$ represents

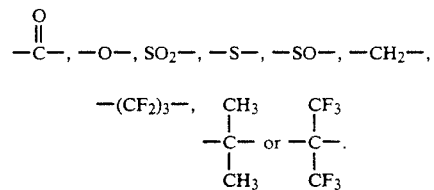

2. The process of claim 1 wherein the compound of formula (1) is bis-γ-aminopropyltetramethyldisiloxane, and the compound of formula (3) is selected from the group consisting of pyromellitic dianhydride, biphenyltetracarboxylic acid dianhydride and benzophenonetetracarboxylic acid dianhydride.

3. A siloxane-modified polyimide resin, which comprises the reaction product of 1 to 40 mol % of a diaminosiloxane having the general formula (1) and 99 to 60 mol % of (2) p-(p-aminobenzamido)-phenyl-p-aminobenzoate, based on the molar content of diamines, with an aromatic tetracarboxylic dianhydride having the general formula (3) in a polar solvent, wherein the aromatic tetracarboxylic dianhydride is reacted with the mixture of compound (1) and compound (2) in an equivalent molar ratio,

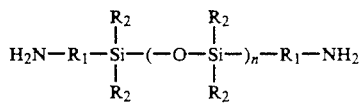
(1)

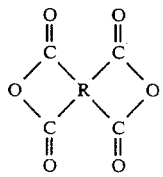
(3)

wherein,
R represents

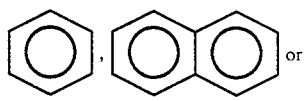
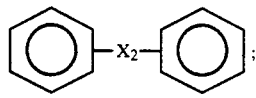

$R_1$ and $R_2$ represent aromatic or aliphatic hydrocarbons;

n represents an integer of 1 to 1000; and $X_2$ represents

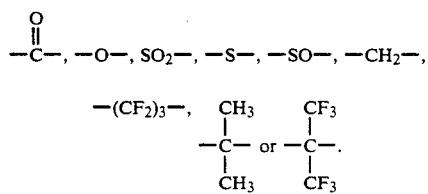

4. A process for preparing siloxane-modified polyimide resins, which comprises reacting 1 to 40 mol % of a diaminosiloxane having the general formula (1) and 99 to 60 mol % of an aromatic diamine (2) selected from the group consisting of p-(p-aminobenzamido)-phenyl-p-(p-aminobenzamido)-benzoate and bis(p-aminophenyl) terephthalate, based on the molar content of diamines, with an aromatic tetracarboxylic dianhydride having the general formula (3) in a polar solvent, wherein the aromatic tetracarboxylic dianhydride is reacted with the mixture of compound (1) and compound (2) in an equivalent molar ratio,

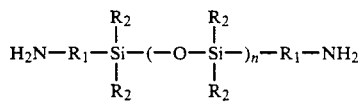 (1)

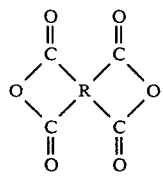 (3)

wherein,
R represents

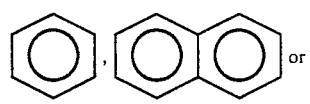
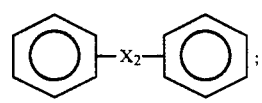

$R_1$ and $R_2$ represent aromatic or aliphatic hydrocarbons;

n represents an integer of 1 to 1000; and $X_2$ represents

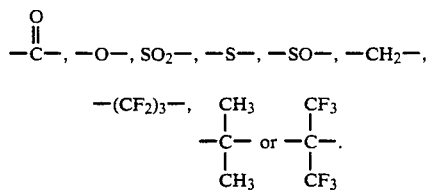

5. A siloxane-modified polyimide resin, which comprises the reaction product of 1 to 40 mol % of a diaminosiloxane having the general formula (1) and 99 to 60 mol % of an aromatic diamine (2) selected from the group consisting of p-(p-aminobenzamido)-phenyl-p-(p-aminobenzamido) benzoate and bis(p-aminophenyl) terephthalate, based on the molar content of diamines, with an aromatic tetracarboxylic dianhydride having the general formula (3) in a polar solvent, wherein the aromatic tetracarboxylic dianhydride is reacted with the mixture of compound (1) and compound (2) in an equivalent molar ratio,

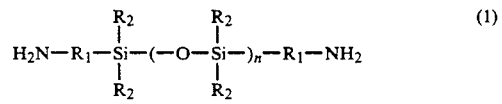 (1)

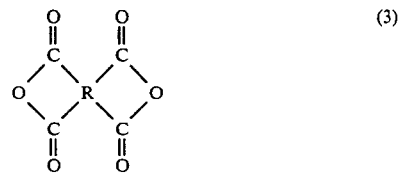 (3)

wherein,
R represents

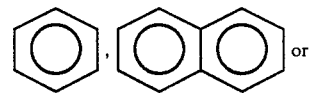
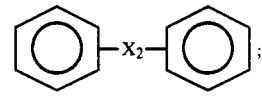

$R_1$ and $R_2$ represent aromatic or aliphatic hydrocarbons;

n represents an integer of 1 to 1000; and $X_2$ represents

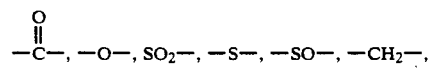
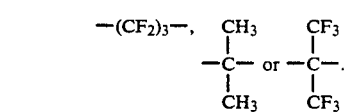

6. The process of claim 4 wherein the compound of formula (1) is bis-γ-aminopropyltetramethyldisiloxane, and the compound of formula (3) is selected from the group consisting of pyromellitic dianhydride, biphenyltetracarboxylic acid dianhydride and benzophenonetetracarboxylic acid dianhydride.

* * * * *